United States Patent
Schophuis et al.

(10) Patent No.: US 10,145,860 B2
(45) Date of Patent: Dec. 4, 2018

(54) SPEED DETECTION USING MULTIPLE PROCESSING PATHS

(71) Applicant: epro GmbH, Gronau (DE)

(72) Inventors: Ernst Hermann Schophuis, Ochtrup (DE); Hermann Beeke, Gescher (DE); Hermann Holtmannspötter, Ochtrup (DE)

(73) Assignee: EPRO GMBH, Gronau (DE)

( * ) Notice: Subject to any disclaimer, the term of this patent is extended or adjusted under 35 U.S.C. 154(b) by 328 days.

(21) Appl. No.: 15/067,699

(22) Filed: Mar. 11, 2016

(65) Prior Publication Data
US 2017/0261530 A1    Sep. 14, 2017

(51) Int. Cl.
G01P 3/36 (2006.01)
G01P 3/44 (2006.01)
G01P 3/481 (2006.01)

(52) U.S. Cl.
CPC .................. G01P 3/36 (2013.01); G01P 3/44 (2013.01); G01P 3/481 (2013.01)

(58) Field of Classification Search
CPC ...................................... G01P 3/36; G01P 3/44
See application file for complete search history.

(56) References Cited

U.S. PATENT DOCUMENTS

| | | | | |
|---|---|---|---|---|
| 3,624,640 A * | 11/1971 | Geller | ...... | G05B 19/33 341/113 |
| 9,650,054 B1 * | 5/2017 | Lombrozo | ...... | B60W 50/00 |
| 2003/0052814 A1 * | 3/2003 | Corbrion | ...... | G01S 13/60 342/104 |
| 2006/0234699 A1 * | 10/2006 | Franckart | ...... | G01S 19/22 455/427 |
| 2011/0141486 A1 * | 6/2011 | Wada | ...... | G06F 3/011 356/614 |

* cited by examiner

Primary Examiner — Mamadou Diallo
(74) Attorney, Agent, or Firm — Luedeka Neely Group, P.C.; Stephen Adams; Rick Barnes

(57) ABSTRACT

Two speed measurements of a moving body are generated using a single signal. A sensor generates a composite signal having a series of pulses where each pulse is generated when an element on a moving body passes the sensor. A sensor conditioning unit decouples the composite signal to generate a first conditioned sub-signal having only an AC signal corresponding to an AC component of the composite signal and a second conditioned sub-signal corresponding to the composite signal that may have either or both AC and DC components. A timer/counter input unit computes a first speed measurement by determining a count of pulses in the first conditioned sub-signal and a first time period or the time period of one pulse. The second conditioned sub-signal is transmitted to an analog-to-digital converter (ADC) and is sampled at a sampling rate to generate a sampled second conditioned sub-signal. An acquisition unit computes a second speed measurement by determining a count of pulses in the sampled second conditioned sub-signal over a second time period or the time of a single pulse. An analysis of the second conditioned sub-signal may be used to choose trigger or filter criteria for the analysis of both conditioned sub-signals, and multiple speed sensors may be used with each sensor producing two speed measurements.

22 Claims, 7 Drawing Sheets

SPEED DETECTION USING MULTIPLE PROCESSING PATHS

FIELD

This invention relates to the field of machine condition monitoring. More particularly, this invention relates to speed measurement of moving machinery.

BACKGROUND

Tracking and measuring the speed of rotation of rotating machinery, such as fans and motors, has a number of important applications. For example, speed measurements may be utilized in detecting and analyzing fault conditions of the machinery, such as a machine that is not balanced or aligned due to wear, misuse, uneven load, foreign matter accumulation, etc. Likewise cracks in machinery or other faults may be discovered by vibration analysis and speed measurement is used to analyze vibration. To accurately monitor machinery, speed measurements are needed that are reliable, accurate, verifiable and sufficiently resolved (e.g., sampling speed) for the particular application.

This invention is a method and apparatus for detecting and measuring the speed of rotation of machinery that provides detailed, accurate data that may be verified, manipulated and analyzed.

SUMMARY

The above and other needs are met by an apparatus and method for generating two speed measurements of a moving body using a single signal. The apparatus includes an element disposed on the body that may be detected by a sensor as the body moves. Also, a sensor positioned near the body is configured to detect the element as the body moves and generates a composite signal having at least one pulse, but preferably a series of pulses, where each pulse is generated when the sensing element is moved and is detected by the sensor. The sensor transmits the composite signal to a sensor conditioning unit. The sensor conditioning unit decouples the composite signal to generate a first conditioned sub-signal and a second conditioned sub-signal corresponding to the composite signal. The sub-signals may each have either or both an AC component and a DC component. Alternatively, each sub-signal may represent a portion of the composite signal (e.g., top and bottom).

A timer/counter having a clock generates clock ticks receives the first conditioned sub-signal transmitted by the sensor conditioning unit and then determines a first speed measurement based on a count of at least one pulse in the first conditioned sub-signal and a first time over pulse or pulse over time measurement. An analog-to-digital converter (ADC) for receives the second conditioned sub-signal transmitted by the sensor conditioning unit and samples the second conditioned sub-signal at a sampling rate to generate a sampled second conditioned sub-signal. A data acquisition unit receives the sampled second conditioned sub-signal. The sampled second conditioned sub-signal is stored in a memory and then a processing circuit computes a second speed measurement based on a count of at least one pulse in the second conditioned sub-signal and a second time over pulse or pulse over time measurement.

According to the method, a moving body has an element that may be detected by a sensor as the moving body moves. The sensor may be an eddy current sensor, a hall effect sensor, a light sensor, or other types of sensors. The sensor generates a composite signal having a series of pulses where each pulse is generated when the sensing element is moved past the sensor. The composite signal is transmitted to a sensor conditioning unit that decouples the composite signal to generate a first conditioned sub-signal and a second conditioned sub-signal. In certain embodiments, the first conditioned sub-signal has only an AC signal corresponding to an AC component of the composite signal. In other embodiments, the first conditioned sub-signal may include a DC component as well. The second conditioned sub-signal corresponds to the composite signal and may have either or both AC and DC components.

The first conditioned sub-signal is transmitted to a timer/counter input unit, which computes a first speed measurement based on a count of at least one pulse in the first conditioned sub-signal and a first time over pulse or pulse over time measurement. The second conditioned sub-signal is transmitted to an analog-to-digital converter (ADC) and is sampled at a configurable or adjustable sampling rate to generate a sampled second conditioned sub-signal. A suitable sampling frequency is 96000 Hz. The sampled second conditioned sub-signal is transmitted to a data acquisition unit, which computes a second speed measurement based on a count of at least one pulse in the second conditioned sub-signal and a second time over pulse or pulse over time measurement. In certain embodiments, the step of computing a first speed measurement is based upon a count of the multiple pulses in the first conditioned sub-signal, and the step of computing a second speed measurement is based upon a count of multiple pulses in the second conditioned sub-signal.

In certain embodiments, the method also stores a first or lower trigger criterion in a memory of the data acquisition unit and detects a pulse in the first conditioned sub-signal, the second conditioned sub-signal, or both only when first criterion is met. For example, only when the amplitude or duration of the pulse meets the criterion specified. The method may also store a second or upper trigger criterion in the memory of the data acquisition unit and detecting a pulse in the in first conditioned sub-signal, the second conditioned sub-signal, or both only when the second criterion is met. Again, if desired, the upper trigger criteria may require both an amplitude and a duration The trigger criteria may be automatically modified. For example, the criteria may be adjusted automatically in response to the presence of noise in the signal or a DC offset in the signal. In other embodiments, the input signal may be adjusted in response to noise in the signal or to adjust the signal to the trigger criteria (e.g., DC offset). Trigger commands, such as trigger criteria may be received from an external input.

The upper and lower trigger criteria may also be used alternatively. That is, the lower trigger criteria may be used during periods of time of low noise. Thus, a pulse will be counted whenever the composite signal meets or exceeds the lower trigger criteria. However, in the presence of detected high levels of noise, the upper trigger criteria may be used and a pulse will be counted only when the composite signal meets or exceeds the upper trigger criteria. Again, the upper trigger criteria and the lower trigger criteria may have requirements of both amplitude and duration.

In other embodiments, the first conditioned sub-signal is analyzed using a first trigger level such that a pulse is counted only if the first conditioned sub-signal meets or exceeds the first trigger level. The second conditioned sub-signal is analyzed using a second trigger level such that a pulse is counted only if the second conditioned sub-signal meets or exceeds the second trigger level. And the second conditioned sub-signal is monitored for noise and first and second trigger levels are increased to third and fourth higher trigger levels when noise in the second conditioned sub-signal exceeds a predetermined level.

The data acquisition unit counts the detected pulses over a second time period and calculates a speed based on a count of at least one pulse in the second conditioned sub-signal and a second time over pulse or pulse over time measurement. In addition, the data acquisition unit may generate a series of pulses in the digital domain representing and corresponding to the pulses in the second conditioned sub-signal that met both the upper trigger requirements and the lower trigger requirements, or one or either of the trigger criteria requirements, as desired. The series of pulses in the digital domain may be transmitted to other equipment for use in other calculations, or the series of pulses may be converted to the analog domain and again transmitted to other equipment.

An upper and lower trigger criterion may be transmitted from the data acquisition unit to the timer/counter and the timer/counter is configured to respond to the trigger criteria and will count pulses in the composite signal only if the composite signal meets the conditions of both the upper and lower trigger criteria. Alternatively, the timer/counter may be configured to count a pulse in the composite signal only if the amplitude of the composite signal meets or exceeds the lower trigger criteria. Alternatively, the timer-counter may be configured to count a pulse in the composite signal only if the amplitude of the composite signal meets or exceeds the upper trigger criteria. This latter configuration may be used when a high noise level is detected in the composite signal.

In certain embodiments, the method includes the steps of providing a first trigger criterion in the timer/counter for the first conditioned sub-signal, providing a second trigger criterion in the data acquisition unit for the second conditioned sub-signal. Then processing the second conditioned sub-signal (e.g., digital processing), adjusting the second trigger criterion, or both, in response to the presence of noise in the second conditioned sub-signal. Also processing the first conditioned sub-signal based on the processing of the second conditioned sub-signal. Finally, the method includes counting pulses in the first conditioned sub-signal based on the first trigger criterion such that a pulse is counted whenever the first conditioned sub-signal satisfies the first trigger criterion and counting pulses in the second conditioned sub-signal based on the second trigger criterion such that a pulse is counted whenever the second conditioned sub-signal satisfies the second trigger criterion. Accordingly, the signals may be digitally processed before speed is calculated. Also, the signals may be processed after an initial speed calculation to improve the speed calculation and then the speed is calculated again. The process may be repeated a number of times to improve the data. Additionally, the two speed calculations may be compared to one another. Based on this comparison, for example if there is a discrepancy that exceeds a certain amount, an alert maybe generated or the signal may be further processed.

In an alternative embodiment, an apparatus and method is provided for generating a vibration measurement and a speed measurement of a moving body using a single signal.

The apparatus includes an element disposed on the body that may be detected by a sensor, such as a proximity or vibration sensor, as the body moves. Also, a sensor positioned near the body is configured to detect the element as the body moves and generates a composite signal having at least one pulse, but preferably a series of pulses, where each pulse is generated when the sensing element is moved and is detected by the sensor. The sensor transmits the composite signal to a sensor conditioning unit. The sensor conditioning unit decouples the composite signal to generate a first conditioned sub-signal and a second conditioned sub-signal corresponding to the composite signal. The sub-signals may each have either or both an AC component and a DC component. Alternatively, each sub-signal may represent a portion of the composite signal (e.g., top and bottom).

A timer/counter having a clock generates clock ticks receives the first conditioned sub-signal transmitted by the sensor conditioning unit and then determines a speed measurement based on a count of at least one pulse in the first conditioned sub-signal and a first time over pulse or pulse over time measurement. An analog-to-digital converter (ADC) for receives the second conditioned sub-signal transmitted by the sensor conditioning unit and samples the second conditioned sub-signal at a sampling rate to generate a sampled second conditioned sub-signal. A data acquisition unit receives the sampled second conditioned sub-signal. The sampled second conditioned sub-signal is stored in a memory and then a processing circuit is used to analyze the vibration of the moving body.

According to the method, a moving body has an element that may be detected by a sensor as the moving body moves. The sensor may be an eddy current sensor, a hall effect sensor, a light sensor, or other types of sensors. The sensor generates a composite signal having a series of pulses where each pulse is generated when the sensing element is moved past the sensor. The composite signal is transmitted to a sensor conditioning unit that decouples the composite signal to generate a first conditioned sub-signal and a second conditioned sub-signal. In certain embodiments, the first conditioned sub-signal has only an AC signal corresponding to an AC component of the composite signal. In other embodiments, the first conditioned sub-signal may include a DC component as well. The second conditioned sub-signal corresponds to the composite signal and may have either or both AC and DC components.

The first conditioned sub-signal is transmitted to a timer/counter input unit, which computes a first speed measurement based on a count of at least one pulse in the first conditioned sub-signal and a first time over pulse or pulse over time measurement. The second conditioned sub-signal is transmitted to an analog-to-digital converter (ADC) and is sampled at a configurable or adjustable sampling rate to generate a sampled second conditioned sub-signal. A suitable sampling frequency is 96000 Hz. The sampled second conditioned sub-signal is transmitted to a data acquisition unit, which computes a second speed measurement based on a count of at least one pulse in the second conditioned sub-signal and a second time over pulse or pulse over time measurement. In certain embodiments, the step of computing a speed measurement is based upon a count of the multiple pulses in the first conditioned sub-signal.

In certain embodiments, the method also stores a first or lower trigger criterion in a memory of the data acquisition unit and detects a pulse in the first conditioned sub-signal, the second conditioned sub-signal, or both only when first criterion is met. For example, only when the amplitude or duration of the pulse meets the criterion specified. The method may also store a second or upper trigger criterion in the memory of the data acquisition unit and detecting a pulse in the in first conditioned sub-signal, the second conditioned sub-signal, or both only when the second criterion is met. Again, if desired, the upper trigger criteria may require both an amplitude and a duration The trigger criteria may be automatically modified. For example, the criteria may be adjusted automatically in response to the presence of noise in the signal or a DC offset in the signal. In other embodiments, the input signal may be adjusted in response to noise in the signal or to adjust the signal to the trigger criteria (e.g., DC offset). Trigger commands, such as trigger criteria may be received from an external input.

The upper and lower trigger criteria may also be used alternatively. That is, the lower trigger criteria may be used during periods of time of low noise. Thus, a pulse will be counted whenever the composite signal meets or exceeds the lower trigger criteria. However, in the presence of detected high levels of noise, the upper trigger criteria may be used and a pulse will be counted only when the composite signal meets or exceeds the upper trigger criteria. Again, the upper trigger criteria and the lower trigger criteria may have requirements of both amplitude and duration.

In other embodiments, the first conditioned sub-signal is analyzed using a first trigger level such that a pulse is counted only if the first conditioned sub-signal meets or exceeds the first trigger level. The second conditioned sub-signal is analyzed using a second trigger level such that a pulse is counted only if the second conditioned sub-signal meets or exceeds the second trigger level. And the second conditioned sub-signal is monitored for noise and first and second trigger levels are increased to third and fourth higher trigger levels when noise in the second conditioned sub-signal exceeds a predetermined level.

The data acquisition unit counts the detected pulses over a second time period and calculates a speed based on a count of at least one pulse in the second conditioned sub-signal and a second time over pulse or pulse over time measurement. In addition, the data acquisition unit may generate a series of pulses in the digital domain representing and corresponding to the pulses in the second conditioned sub-signal that met both the upper trigger requirements and the lower trigger requirements, or one or either of the trigger criteria requirements, as desired. The series of pulses in the digital domain may be transmitted to other equipment for use in other calculations, or the series of pulses may be converted to the analog domain and again transmitted to other equipment.

An upper and lower trigger criterion may be transmitted from the data acquisition unit to the timer/counter and the timer/counter is configured to respond to the trigger criteria and will count pulses in the composite signal only if the composite signal meets the conditions of both the upper and lower trigger criteria. Alternatively, the timer/counter may be configured to count a pulse in the composite signal only if the amplitude of the composite signal meets or exceeds the lower trigger criteria. Alternatively, the timer/counter may be configured to count a pulse in the composite signal only if the amplitude of the composite signal meets or exceeds the upper trigger criteria. This latter configuration may be used when a high noise level is detected in the composite signal.

In certain embodiments, the method includes the steps of providing a first trigger criterion in the timer/counter for the first conditioned sub-signal, providing a second trigger criterion in the data acquisition unit for the second conditioned sub-signal. Then processing the second conditioned sub-signal (e.g., digital processing), adjusting the second trigger criterion, or both, in response to the presence of noise in the second conditioned sub-signal. Also processing the first conditioned sub-signal based on the processing of the second conditioned sub-signal. Finally, the method includes counting pulses in the first conditioned sub-signal based on the first trigger criterion such that a pulse is counted whenever the first conditioned sub-signal satisfies the first trigger criterion and counting pulses in the second conditioned sub-signal based on the second trigger criterion such that a pulse is counted whenever the second conditioned sub-signal satisfies the second trigger criterion. Accordingly, the signals may be digitally processed before speed or vibration measurements are determined. Also, the signals may be processed after an initial speed calculation to improve the speed calculation and then the speed or vibration determined again. The process may be repeated a number of times to improve the data.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

The following disclosure describes various embodiments of an apparatus for generating at least two speed measurements of a moving body using a single sensor signal. The apparatus may be used, for example, to detect the speed of rotation for use in analyzing vibration in a machine. The apparatus uses two separate internal processing paths to detect and measure speed, where both measurements are derived from the same input signal received from a single sensor. Additional sensors, each enabling multiple speed measurements to be calculated based on a single signal generated by the sensor, may be added. Comparing the speed measurements taken from these multiple sensors allows for additional information about the moving body to be obtained and for the data to be enhanced.

Figure 1:
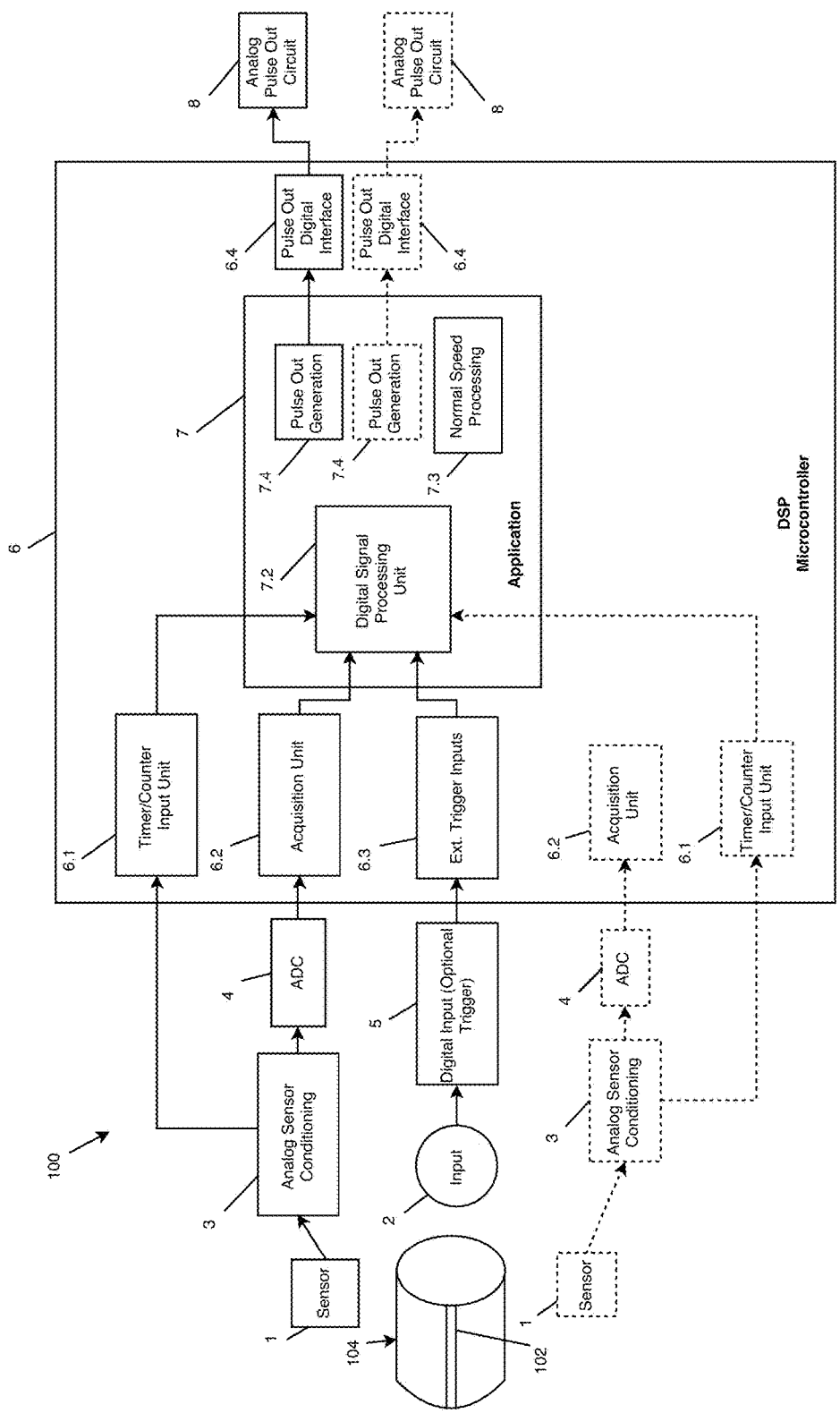
FIG. 1 is a diagram illustrating a system for generating at least two speed measurements of a moving body using a single sensor signal according to an embodiment of the present invention.

With reference to FIG. 1, the apparatus 100 includes an element 102, such as a notch, tooth, trigger mark, foil or other similar device, that is located on a moving body 104, such as a rotating shaft of a motor, a gear, a pump, a fan, etc. The element 102 is detected by a sensor 1 as the body 104 moves. For example, the sensor 1 may detect movement of the element 102 due to vibration, rotation or translation of the moving body 104. Sensors 1 may include hall effect sensors, eddy current senses, light sensors and the like. In other cases, electrodynamic sensors or other analog input sources may be used. Movement of the body 104 is captured by the sensor 1, and that movement is represented as a composite signal (i.e., raw sensor data), which is generated by the sensor in response to movement of the body. A pulse is generated in the composite signal when the sensing element 102 is in proximity to the sensor 1, such as when the element rotates past the sensor after being placed on a rotating shaft. Therefore, in the case of a rotating shaft or a moving body having relatively constant or repetitive movement in proximity to the element, that movement is represented in the composite signal as a series of pulses. Speed may be calculated by correlating (counting) those pulses to a time measurement. Specifically, the speed calculation may be made based on the number of pulses per time period or the time required for a number of pulses to occur.

The composite signal from the sensor 1 (or other analog input source) is transmitted to and is analog processed by an analog sensor conditioning unit 3. A main task of the analog sensor conditioning unit 3 is to adapt data from the sensor 1 to the measurement system 100 for calculating speed along two processing routes. This includes adjusting the signal to an appropriate voltage range.

Additionally, another function of the analog sensor conditioning unit 3 is to separate the composite signal into two or more sub-signals. In one particular embodiment the composite signal is DC decoupled to generate a first conditioned sub-signal having only an AC signal corresponding to an AC component of the composite signal. However, in certain other embodiments, the first conditioned sub-signal may have a DC component as well. The sensor conditioning unit 3 may also extract error pulses and other distortions from the signal.

The sensor conditioning unit 3 feeds the first conditioned sub-signal to a Timer/Counter Input Unit 6.1 of a Digital Signal Processor 6 or a microcontroller. The digital signal processor 6 includes a Timer/Counter 6.1 that counts pulses in the first conditioned sub-signal and it also counts internally generated clock ticks (also known as clock pulses). To determine speed, the timer/counter input unit 6.1 divides the number of pulses by the number of clock ticks, or vice versa, and generates a digital speed number corresponding to speed. The digital speed number is repetitively calculated and repetitively transmitted to the digital signal processing unit 7.2. The timer/counter 6.1 may calculate the speed in several different ways. For example, it may count the number of timer ticks over a single pulse. As the speed increases, the duration of the pulse will decrease and, thus, the duration of the pulse corresponds to the speed. Thus, the digital speed number is calculated by dividing a constant by the number of clock ticks that are counted in a single pulse. Alternatively, and more accurately, the digital speed number may be calculated by counting the number of pulses over a specified time and dividing the number of pulses by the time. This number is also multiplied by a constant to reflect the physical condition of the equipment and generate a number that corresponds to speed. Likewise, the digital speed number may be calculated by counting the number of ticks in a specified number of pulses and then dividing a constant by count of the ticks. Again, the constant is chosen such that the result of the division generates a digital speed number that corresponds to speed based on the physical arrangement of the equipment.

The digital signal processor 6 runs an application 7 using a digital signal processing unit 7.2 that calculates the speed of the moving body using the digital speed number generated by the timer/counter 6.1. The microprocessor may output the speed in digital form for use in other processing apparatus, or it may generate an analog output pulse signal using the pulse out generation application that controls the pulse out digital interface to generate and the analog output pulse signal corresponding to speed. The phase of the analog pulse output signal may be controlled to match the phase of the sensor signal pulses generated by the analog sensor conditioning circuit by using phase timing signals that are generated by the timer/counter input unit 6.1. For example, the digital speed numbers may be output from the timer/counter unit 6.1 in a known phase relationship with the leading edge or trailing edge of each pulse detected in the first composite signal. In such case the microprocessor may control the phase of the analog output pulse signal of the interface 6.4 based on the arrival time of each digital speed number from the timer/counter 6.1.

An advantage of using the Timer/Counter Input Unit 6.1 to sample the DC-decoupled signal is the high resolution of the Timer/Counter Input Unit 6.1 of the DSP/Microcontroller 6. In general, a much higher resolution may be achieved along the analog path than along the digital path. In fact, the rate at which the digital speed number is generated by the timer/counter unit can be near to internal processor clock of the microprocessor 6. This increases speed measurement resolution, which is especially beneficial for high speed signals. However, one disadvantage is that no information related to the sensor state can be derived using this processing method. The Timer/Counter Input Unit 6.1 has only a minimum analog front end. It can ensure that the sensor input amplitude is within an acceptable range needed for High/Low detection and that edge triggering is supported. However, real-time information about the raw signal amplitude cannot be derived from the signal. In large part, no trigger criteria adjustments or adjustments for sensor supervision can be made based on information derived from the Timer/Counter input 6.1. In certain cases, however, the trigger criteria can only be met by adding a small DC offset to the signal, so this small adjustment may be necessary on occasion.

However, an advantage of this invention is that determining speed using two or more processing paths or methods provides for a wider range of information to be acquired at the same time than would be obtained from using only a single processing path. Accordingly, as discussed below, the present system 100 overcomes the above-described limitations by calculating speed using a second, separate processing method. The two processing methods are complementary in that the strengths of calculating speed using one method overcome the weaknesses of calculating speed using the other method.

The sensor conditioning unit 3 generates a second conditioned sub-signal corresponding to the composite signal that may have either or both the AC component and a DC component. The second conditioned sub-signal is transmitted from the analog sensor conditioning unit 3 to an Analog-to-Digital Converter (ADC) 4. The ADC samples the signal at a configurable (i.e., adjustable) sample rate. For example, in one embodiment, the system 100 works at 96000 Hz sample rate. However, in other embodiments, higher or lower rates may be used, but higher rates are preferred.

After the second conditioned sub-signal has been converted from an analog signal to a digital signal, a digital acquisition unit 6.2 may be used to perform additional processing steps to the sampled data. Therefore, an advantage of using the digital Acquisition Unit 6.2 is the possibility to perform various filtering and other algorithms in the digital signal processing unit 7.2. In contrast to calculating speed based on DC-decoupled signals using the Timer/Counter Input Unit 6.1, which is especially useful for high speed signals, using the acquisition unit 6.2 is well suited for measuring low speed frequency input, including down to DC.

The signal acquired via this path contains DC information, and this DC information may be used for sensor supervision and trigger criteria setting. For example, the DC level or AC+DC level may be observed to determine various characteristics of the signal such as absolute sensor input range as well as the maximum peak and minimum peak of the signal. Additionally, the AC signal may also be monitored and the AC peak-to-peak value, maximum peak, and minimum peak values may be determined.

Also, the DC information allows for trigger criteria setting and for noisy signals to be pre-processed in order to avoid incorrect or faulty measurements. For example, if a signal includes noise or aberrant sensor data (e.g., other nearby machinery), the noise might be interpreted as a pulse and an incorrect speed calculation might result. By setting one or more trigger criteria settings, a certain amount of noise may be removed from the signal data or other unwanted portions of the signal may be filtered out in order to improve the data and the resulting speed calculation. This type of processing is helpful in obtaining a more accurate speed calculation. These trigger criteria setting might include, for example, setting a minimum pulse amplitude or duration time to qualify as a pulse and to be included in the speed calculation. If the data does not satisfy the trigger criteria settings or conditions, that portion of the data is not considered to be a pulse and is excluded from the speed calculation. These settings are done in the digital domain so they are fully controllable and can be changed during runtime.

Due to the limitations of the Timer/Counter 6.1, this type of data manipulation, including trigger criteria setting, filtering, etc., cannot ordinary be performed on the data analyzed by the Timer/Counter 6.1. However, data obtained by the acquisition unit 6.2 can be used to determine the appropriate data manipulation steps that should be performed, which may then be performed on the data being analyzed by the Timer/Counter 6.1. In other words, measurement information from the Timer/Counter 6.1 can be used to improve the measure information from the Acquisition Unit 6.2, and vice versa. For example, since the Timer/Counter 6.1 only detects transitions on the edges of the input signal, it is insensitive to signal level variation, but with the speed information derived from the Acquisition Unit 6.2, certain filters and trigger criteria may be set for the Timer/Counter. The processing steps used in adjusting the data analyzed by the Timer/Counter 6.1 (i.e., analog data) are not identical to the processing steps used in adjusting the data analyzed by the Acquisition Unit 6.2 (i.e., digital data). However, the processing steps applied to the analog data may be based on the processing steps applied to the digital data. For example, certain portions of the analog data may be suppressed or gain or a DC offset may be applied to the data. In another example, if it is discovered that there is one unit of noise present in the second conditioned sub-signal as a result of nearby machines, the acquisition unit 6.2 could be programmed to filter out that 1 unit of noise in the second conditioned sub-signal. It might be also assumed that that same level of noise is present in the first conditioned sub-signal, so similar filtering may be applied to the first conditioned sub-signal by the digital signal processing unit 7.2 prior to calculating speed along that path.

Certain embodiments of the apparatus 100 are provided with a digital input (optional trigger) 5, which receives information from an external input 2. The optional trigger 5 may be used as a process input or as a trigger input to modify the behavior of the system in response to the signal data. A process input may be a digital switch which instructs a system to use different parameter settings, which may be used to set different operational states of a machine. The parameter settings may include, for example, the maximum speed allowed before a warning or glitch detection notification is issued. Another parameter setting that may be adjusted is the measurement time settings. By adjusting this parameter, a user may select between a lower response time or a higher measurement accuracy.

Figure 2:
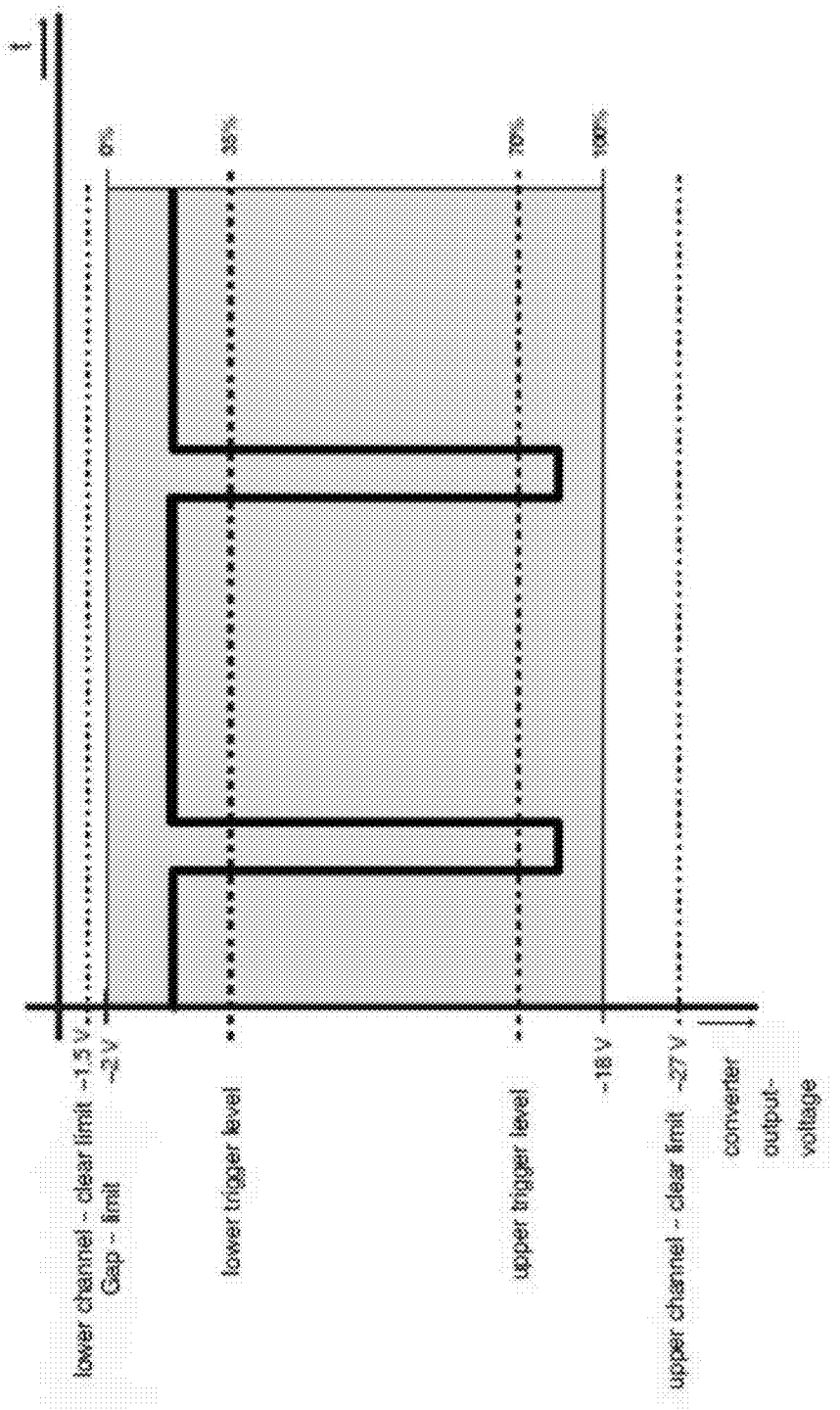
FIG. 2 is a chart showing a composite signal and including upper and lower trigger criteria.

In this particular case, the system has binary logic, which functions like an ON/OFF switch that may be used to turn certain features of the machine on or off. With reference to FIG. 2, the logic of this particular system contains "high" and "low" states (e.g., a 24V logic) and the behavior of the system may be changed depending on whether it is in the "high" or the "low" state. The external input has been used to set a first or lower trigger criterion at 35% and a second or upper trigger criterion at 70% of the acceptable voltage range between −2V and −18V. If the voltage of the second conditioned sub-signal is no more than the 35% threshold, the system is in the "low" state. On the other hand, if the voltage of the second conditioned sub-signal is at least equal to the 70% threshold, the system is in the "high" state.

This logic may be used to provide a wide variety of information about the rotating equipment. For example, it could be used to indicate whether there is a pulse or not. A pulse may only be counted when the system is in a "high" state. The system might shut down if the voltage readings are outside of the specified range. For example, triggering a "high" or "low" state could cause the system to be shut down. This would be beneficial for preventing an unsafe operating condition, such as a motor that is rotating too slowly or too quickly. In addition to or instead of shutting the system down, an alarm might be triggered if a "high" or "low" state is detected or triggered.

After being processed and filtered in the manner discussed above, the second conditioned sub-signal is transmitted from the acquisition unit to the digital signal processing unit 7.2. The digital signal processing unit 7.2 then computes a second speed measurement based on a count of pulses in the sampled second conditioned sub-signal over a second time period. The system may be further configured to carry out certain post-processing steps after the speed calculations have been computed. These steps may be carried out to improve the speed calculations or to select the best speed calculation or to make additional findings based on the speed calculations. The system may include a feedback loop where the speed calculations are re-calculated based on post-processed data.

In one embodiment, the digital signal processing unit 7.2 may be configured to provide warnings or to accept or reject a speed calculation based on preprogrammed criteria. The digital signal processing unit 7.2 may be configured to compare the first and second speed measurements and to generate an error signal when the first and second speed measurements differ by a predetermined magnitude. For example, if the two speed calculations vary by a certain amount (e.g., 1 rpm or more) or by a certain percentage (e.g., 1% or more), the digital signal processing unit 7.2 may be programmed to output an error signal and to take some other further action, such as halt the moving body or to re-run the speed calculations. The digital signal processing unit 7.2 may also be configured to compare the first and second speed measurements and then generate an error signal when the first the second speed measurements differ by a predetermined amount and then to select one of the speed measurements as the correct measurement based on predetermined criteria. For example, the digital signal processing unit 7.2 may be programmed to select the highest or the lowest speed value calculated. Alternatively, an expected speed value may be entered using an optional trigger/digital input 5 and the speed selected might be the one that is closest to the expected value. In other embodiments, the digital signal processing unit 7.2 might use the integral or derivative of the speed calculations to determine displacement or acceleration of the moving body.

Figure 3:
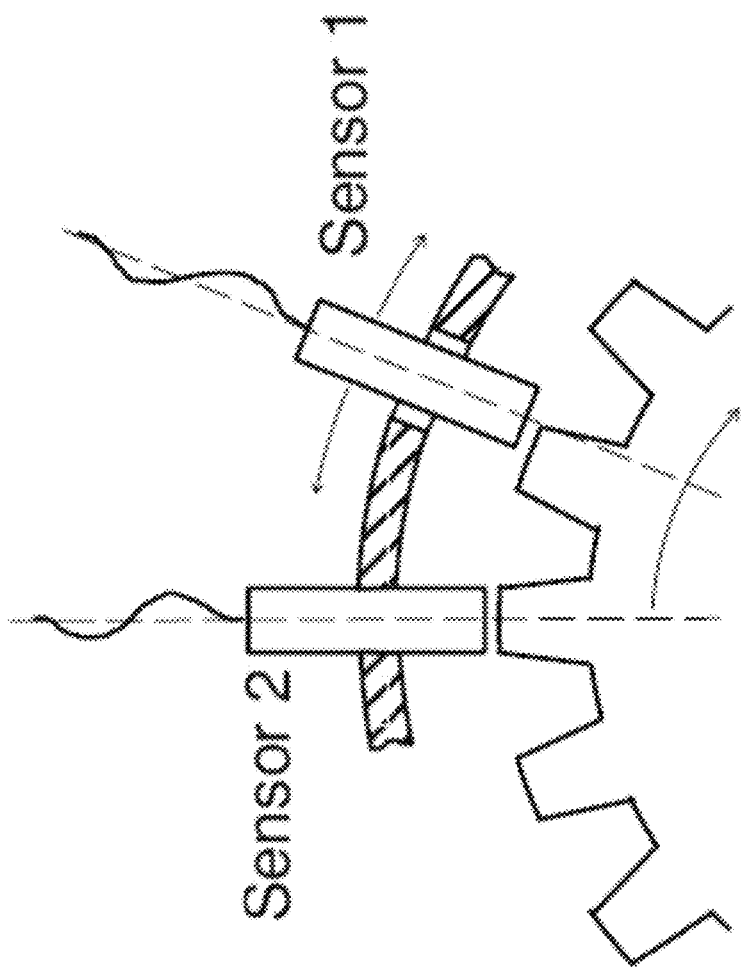
FIG. 3 is a representation of a rotating body and multiple sensors placed in proximity to the rotating body for detecting movement.

In the discussion above, only a single sensor has been used for determining the speed of the moving body. However, FIG. 3 is a slightly more complicated version that includes an additional sensor that may also be used to determine speed using multiple processing paths. The lines are dashed to emphasize the point that a second sensor is optional and is not required for the normal operation of this system 100. The two sensors are each configured to detect the teeth of the gear as they pass by. Understandably, this results in twice as many pulses in each composite signal than when a single sensor is used. Therefore, the system is equipped to compensate for the additional sensor. Likewise, the system is equipped to compensate in the case of multiple elements (e.g., teeth) being present.

Once speed measurements are obtained using two or more sensors, that information may be correlated to uncover additional information related to the system. For example, the speed measurements may be correlated to determine rotational direction, whether the body is standing still, etc. In another example, one sensor's data may be used to measure the speed, while the second sensor's data may be used to measure displacement or vibration. These two measurements may then be correlated to uncover any trends or patterns. This may be particularly beneficial in the maintenance of rotating machinery when diagnosing or preventing a potential problem. The system may also output different types of information based on the signal generated by each sensor. For example, the signal data from one sensor may be used to generate a speed or acceleration measurement, while the signal data from a second sensor may be used to calculate displacement or vibration of the machinery.

Figure 4:
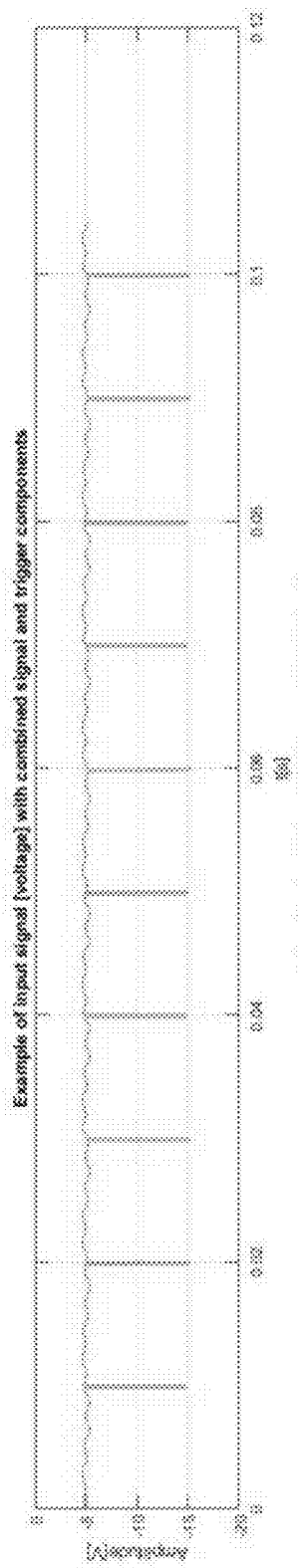
FIG. 4 is a graphical representation of an input signal having signal and trigger components combined.
Figure 5:
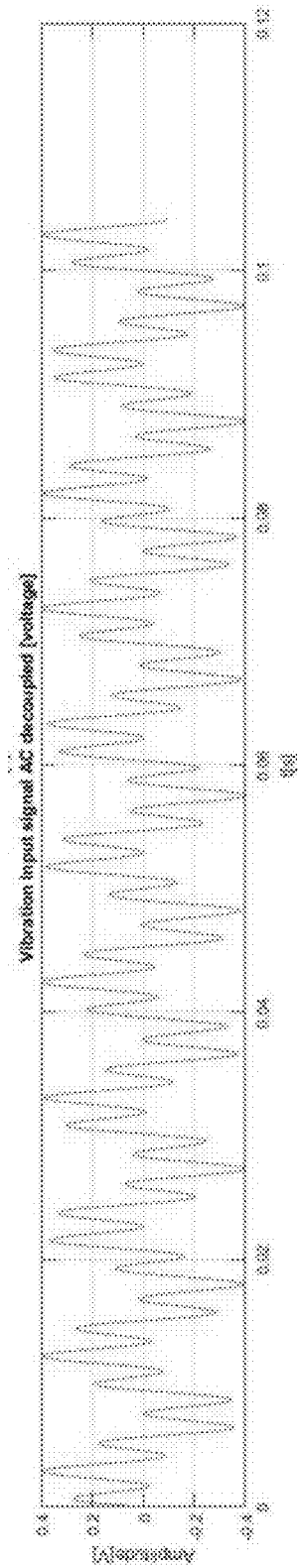
FIG. 5 is a graphical representation of a DC-decoupled vibration-only signal.
Figure 6:
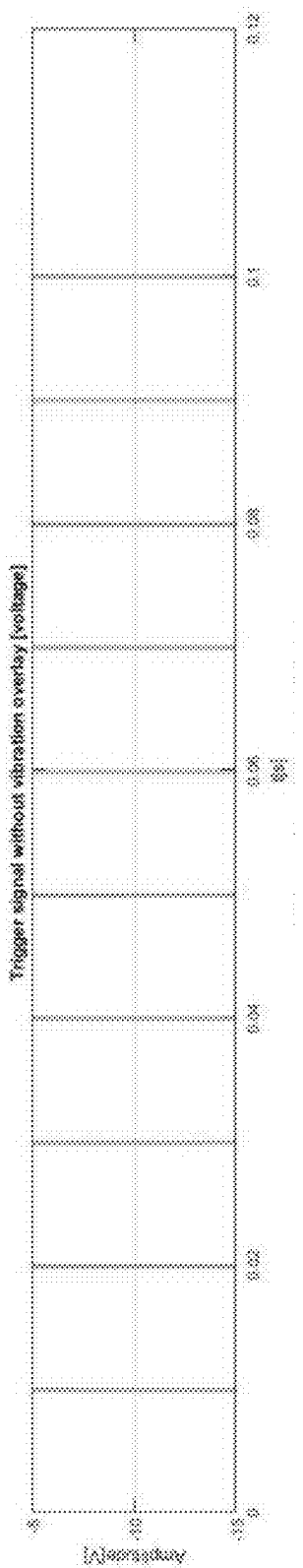
FIG. 6 is a graphical representation of a trigger signal without vibration overlay.
Figure 7:
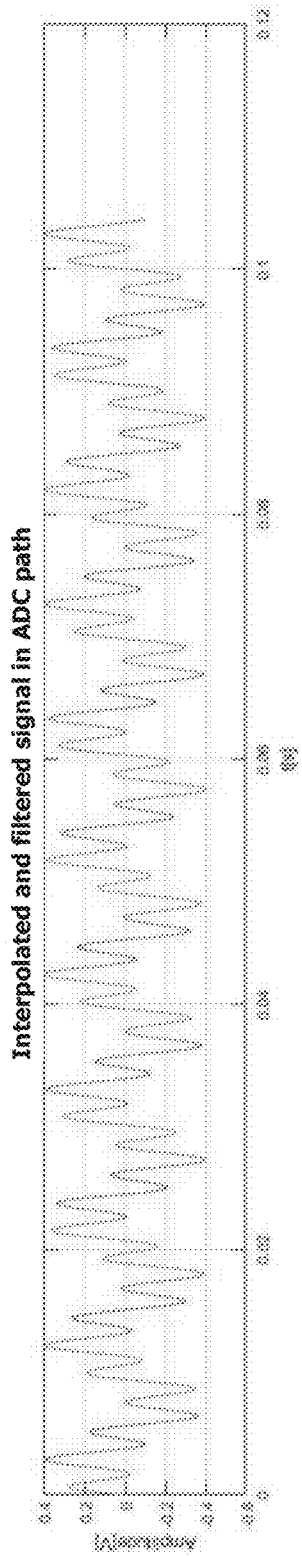
FIG. 7 is a graphical representation of an interpolated and filtered vibration-only signal.

In an alternative embodiment, data from a single sensor may be used to derive different types of measurements using each processing path. For example, vibration may be calculated by the acquisition unit 6.2 and speed may be calculated by the timer/count 6.1. The sensor input signal is derived, for example, from a rotating shaft with a trigger mark on it. As such, the sensor input signal combines both vibration information and trigger information, as shown in FIG. 4. The constant low-level vibration information in the signal will be recognized as noise and can be separated from the pulses, which may be used to calculate speed. The first trigger level (or the input signal itself) may be adjusted so that the edge of the spike in the input signal is recognized as a pulse. These spikes occur as a result of the rotation of the shaft past the sensor. In FIG. 6, the vibration information has been removed and only the spikes or pulses are left. The timer/counter 6.1 can use this signal to derive speed. On the other hand, the same signal may be fed to the acquisition unit 6.2 to calculation vibration information. Using digital signal processing, various routines, such as simple filtering or linear interpolation, may be applied to eliminate or reduce the trigger pulses in the original signal, as shown in FIG. 5. FIG. 7 shows the same signal data as shown in FIG. 5 after being interpolated and filtered. Using this information, the vibration characteristics of the rotating body can be determined by the acquisition unit 6.2.

The system provides a digital pulse out generator 6.4, which is used to generate an output pulse signal. In most cases, the output signal represents the speed of the rotating equipment. However, the signal may be modified to provide the duty cycle of the equipment.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for generating two speed measurements of a moving body using a single signal, the method comprising the steps of:
   providing a moving body having an element disposed thereon that may be detected by a sensor as the moving body moves;
   sensing the element with a sensor as the body moves and generating a composite signal having a first AC component including a series of pulses where each pulse is generated when the element is moved past the sensor, and a second DC component including vibration data sensed from the moving body;
   transmitting the composite signal to a sensor conditioning unit and (1) decoupling the composite signal with the sensor conditioning unit to generate a first conditioned sub-signal corresponding to the first AC component and configured for a timer/counter input unit and (2) generating with the sensor conditioning unit a second conditioned sub-signal corresponding to the second DC component and configured for an analog-to-digital converter (ADC);
   transmitting the first conditioned sub-signal to a timer/counter input unit and computing a first speed measurement based on a count of at least one pulse in the first conditioned sub-signal and a first time over pulse or pulse over time measurement;
   transmitting the second conditioned sub-signal to an ADC and sampling the second conditioned sub-signal at a sampling rate to generate a sampled second conditioned sub-signal; and
   transmitting the sampled second conditioned sub-signal to a data acquisition unit and computing a second speed measurement based on a count of at least one pulse in the second conditioned sub-signal and a second time over pulse or pulse over time measurement.

2. The method of claim 1 wherein the sampling rate is adjustable.

3. The method of claim 1 wherein the step of computing a first speed measurement is based upon a count of the multiple pulses in the first conditioned sub-signal, and the step of computing a second speed measurement is based upon a count of multiple pulses in the second conditioned sub-signal.

4. The method of claim 1 further comprising the step of providing a first trigger criteria and detecting a pulse in the first conditioned sub-signal or the second conditioned sub-signal, or both, only when the second conditioned sub-signal meets the first trigger criterion.

5. The method of claim 4 further comprising the step of providing a second trigger criterion and detecting a pulse in the first conditioned sub-signal or the second conditioned sub-signal, or both, only when the second conditioned sub-signal meets the first and second trigger criteria.

6. The method of claim 5 comprising the step of automatically modifying the first conditioned sub-signal or adjusting the first or second trigger criteria in response to the presence of noise or a DC offset in the composite signal.

7. The method of claim 1 wherein:
the first conditioned sub-signal is analyzed using a first trigger level such that a pulse is counted only if the first conditioned sub-signal meets or exceeds the first trigger level;
the second conditioned sub-signal is analyzed using a second trigger level such that a pulse is counted only if the second conditioned sub-signal meets or exceeds the second trigger level; and
the second conditioned sub-signal is monitored for noise and first and second trigger levels are increased to third and fourth higher trigger levels when noise in the second conditioned sub-signal exceeds a predetermined level.

8. The method of claim 1 further comprising:
providing a first trigger criterion in the timer/counter for the first conditioned sub-signal;
providing a second trigger criterion in the data acquisition unit for the second conditioned sub-signal;
processing the second conditioned sub-signal, adjusting the second trigger criterion, or both, in response to the presence of noise in the second conditioned sub-signal;
processing the first conditioned sub-signal based on the processing of the second conditioned sub-signal;
counting pulses in the first conditioned sub-signal based on the first trigger criterion such that a pulse is counted whenever the first conditioned sub-signal satisfies the first trigger criterion; and
counting pulses in the second conditioned sub-signal based on the second trigger criterion such that a pulse is counted whenever the second conditioned sub-signal satisfies the second trigger criterion.

9. The method of claim 1 further comprising the step of receiving a trigger command from an external input to set a trigger criterion.

10. The method of claim 1 further comprising the step of digitally processing the second conditioned sub-signal before computing the second speed measurement.

11. The method of claim 10 further comprising the step of adjusting the first conditioned sub-signal before computing the first speed measurement based on the digital processing of the second conditioned sub-signal.

12. The method of claim 1 further comprising the step of adjusting the first conditioned sub-signal before computing the first speed measurement.

13. The method of claim 12 further comprising the step of digitally processing the second conditioned sub-signal before computing the second speed measurement based on the adjustment of the first conditioned sub-signal.

14. The method of claim 1 further comprising the step of comparing the first and second speed measurements and implementing an alert response if the speed measurements differ by a specified amount.

15. An apparatus for generating at least two speed measurements of a moving body using a single signal, the apparatus comprising:
an element disposed on the body that may be detected by a sensor as the body moves;
a sensor positioned proximate the body and configured to detect the element as the body moves and to generate a composite signal having a first AC component including a series of pulses, where each pulse is generated when the element is moved past the sensor, and a second DC component including vibration data sensed from the moving body, and to transmit the composite signal to a sensor conditioning unit;
a sensor conditioning unit (1) for decoupling the composite signal to generate a first conditioned sub-signal corresponding to the first AC component, and (2) for generating a second conditioned sub-signal corresponding to the the second DC component;
a timer/counter having a clock generating clock ticks, the timer/counter being configured for receiving the first conditioned sub-signal transmitted by the sensor conditioning unit and having a circuit for determining a first speed measurement based on a count of at least one pulse in the first conditioned sub-signal and a first time over pulse or pulse over time measurement;
an analog-to-digital converter (ADC) for receiving the second conditioned sub-signal transmitted by the sensor conditioning unit and for sampling the second conditioned sub-signal at a sampling rate to generate a sampled second conditioned sub-signal;
a data acquisition unit for receiving the sampled second conditioned sub-signal and having a memory for storing the sampled second conditioned sub-signal; and
a processing circuit for computing a second speed measurement based on a count of at least one pulse in the second conditioned sub-signal and a second time over pulse or pulse over time measurement.

16. The apparatus of claim 15 further comprising a trigger memory configured for receiving and storing a first trigger criteria received from a digital trigger input, and wherein the processing circuit counts a pulse in the second conditioned sub-signal only when the amplitude of the second conditioned sub-signal is at least equal to the first trigger criteria.

17. The apparatus of claim 15 wherein the trigger memory is further configured to receive and store an second trigger criterion received from the digital trigger input, and wherein the processing circuit counts a pulse in the second conditioned sub-signal only when the amplitude of the second conditioned sub-signal is at least equal to the first and second trigger criteria.

18. The apparatus of claim 15 further comprising a digital pulse out generator for generating a pulse output signal based on at least one of the first conditioned sub-signal or the second conditioned sub-signal.

19. The apparatus of claim 15 wherein the processing circuit is configured to compare the first and second speed measurements and for generating an error signal when the first and second speed measurements differ by a predetermined magnitude.

20. The apparatus of claim 15 further comprising:
a second sensor positioned proximate the body and configured to detect the element as the body moves and to generate a second composite signal having a series of pulses, where each pulse is generated when the element is moved past the sensor, and to transmit the composite signal to a sensor conditioning unit;
a second sensor conditioning unit (1) for decoupling the second composite signal to generate a third conditioned sub-signal having only an AC signal corresponding to an AC component part of the second composite signal and (2) for generating a fourth conditioned sub-signal corresponding to the second composite signal that may have either or both the AC component and a DC component;

a second timer/counter having a clock generating clock ticks, the timer/counter being configured for receiving the third conditioned sub-signal transmitted by the sensor conditioning unit and having a circuit for determining a third speed measurement based on a count of at least one pulse in the third conditioned sub-signal and a third time over pulse or pulse over time measurement;

an analog-to-digital converter (ADC) for receiving the fourth conditioned sub-signal transmitted by the sensor conditioning unit and for sampling the fourth conditioned sub-signal at a sampling rate to generate a sampled fourth conditioned sub-signal;

a data acquisition unit for receiving the sampled fourth conditioned sub-signal and having a memory for storing the sampled fourth conditioned sub-signal; and a processing circuit for computing a fourth speed measurement based on a count of at least one pulse in the fourth conditioned sub-signal and a fourth time over pulse or pulse over time measurement.

21. The apparatus of claim 15 wherein the processing circuit is configured to compare the first and second speed measurements and for generating an error signal when the first the second speed measurements differ by a predetermined amplitude and to select one of the first and second speed measurements as the correct measurement based on predetermined criteria.

22. A method for generating two measurements of a moving body using a single signal, the method comprising the steps of:

providing a moving body having an element disposed thereon that may be detected by a sensor as the moving body moves;

sensing the element with a sensor as the body moves and generating a composite signal having a first AC component including a series of pulses where each pulse is generated when the element is moved past the sensor, and a second DC component including vibration data sensed from the moving body;

transmitting the composite signal to a sensor conditioning unit and (1) decoupling the composite signal with the sensor conditioning unit to generate a first conditioned sub-signal corresponding to the first AC component and configured for a timer/counter input unit and (2) generating with the sensor conditioning unit a second conditioned sub-signal corresponding to the second DC component and configured for an analog-to-digital converter (ADC);

transmitting the first conditioned sub-signal to a timer/counter input unit and computing a speed measurement based on a count of at least one pulse in the first conditioned sub-signal and a first time over pulse or pulse over time measurement;

transmitting the second conditioned sub-signal to an ADC and sampling the second conditioned sub-signal at a sampling rate to generate a sampled second conditioned sub-signal; and transmitting the sampled second conditioned sub-signal to a data acquisition unit and computing a vibration measurement.

* * * * *